Patented Aug. 29, 1933

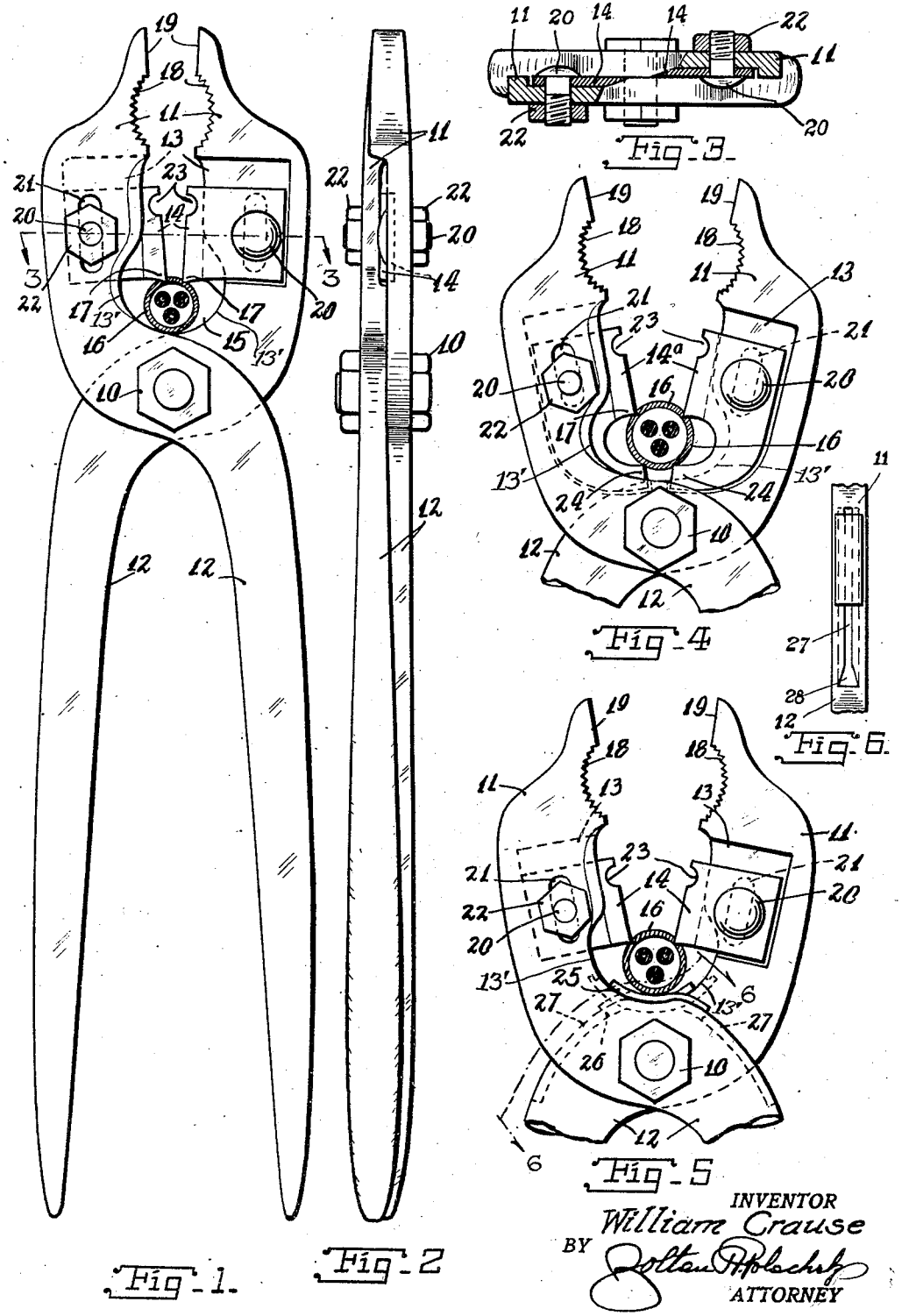

1,924,837

UNITED STATES PATENT OFFICE 1,924,837

ELECTRICIAN'S TOOL

William Crause, Vauxhall, N. J.

Application June 28, 1932. Serial No. 619,642

5 Claims. (Cl. 81—9.5)

This invention relates to new and useful improvements in an electrician's tool.

The invention has for an object the construction of an electrician's tool which is in the form of a pair of pliers or similar tool and which is provided with blades adapted to cut the metal covering of B. X. wire.

It is a further object of this invention to arrange the cutting blades in a manner so that the B. X. wire may be placed immediately adjacent the pivot of the jaws of said tool and the blades disposed over the B. X. wire so as to cut the metallic covering thereof.

As a still further object of this invention it is proposed to provide means whereby the blades may be adjusted to adapt the tool to B. X. wires of different diameters.

As a still further object of this invention it is proposed to arrange the blades for simultaneously cutting the metallic covering of the B. X. wire at the top and bottom.

Furthermore, as another object of this invention it is proposed to provide an arrangement whereby portions of the crossed members forming the tool may be padded so as to hold the B. X. wires at different distances to the blades and thus provide the adjustment for the cutting of B. X. wire coverings of different diameters.

A still further object of this invention is the construction of an article of the class described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a tool constructed according to this invention.

Fig. 2 is an edge elevational view of Fig. 1.

Fig. 3 is a horizontal sectional view taken on the line 3—3 of Fig. 1.

Fig. 4 is a fragmentary view similar to a portion of Fig. 1 but illustrating a modification.

Fig. 5 is another fragmentary view similar to a portion of Fig. 1 but illustrating another modification.

Fig. 6 is a fragmentary elevational view looking in the direction of the line 6—6 of Fig. 5.

The electrician's tool according to this invention comprises a pair of crossed members pivotally mounted intermediately at 10 and having front ends 11 and rear ends 12. The front ends 11 constitute a pair of jaws while the rear ends handles for opening and closing the jaws. The adjacent faces of the jaws 11 are formed with lateral recesses 13 and the opposed faces with opposed recesses 13'. A pair of shearing blades 14 are adjustably mounted longitudinal of the jaws from the pivot 10 in the recess 13 and spaced from the bases of the jaws and intersect the recesses 13' providing a space 15 in which B. X. wire 16 may be placed so that when the jaws are closed the corners 17 of the blades 14 cut the casing thereof.

The handles 12 widen out from the pivot 10 to their extremities so as to be superimposed as shown in Fig. 2. The jaws 11 also widen out from the pivot 10 to their extremities so as to also be superimposed as shown in Fig. 2. The inner faces of the widened portions of the jaws 11 are formed with concaved serrated portions 18 adapted to grip various tubular members and wires. The extreme extremities are formed with gripping portions 19 which may close tightly against each other. The adjustments of the blades 14 are accomplished by reason of studs mounted through the blades 14 and engaging through slots 21 formed at the sides of the jaws. Nuts 22 engage upon the ends of the bolts 20 for clamping the blades in adjusted position. The adjacent edges of the blades 14 are bevelled and are also formed with notches 23 for the stripping of insulation from smaller sized wires.

In Fig. 4, a modification of the invention has been disclosed in which blades 14$^a$ distinguish from those shown in Fig. 1 in that they are provided with lower projecting portions 24 adapted to cut the lower side of the B. X. wire simultaneously with the corners 17 cutting the upper side. In other respects the device is similar and the parts may be recognized by their corresponding reference numerals.

In Figs. 5 and 6 another variation of the invention has been disclosed in which provision is made for having the bases of the jaws padded for the purpose of holding the B. X. wire at different distances from the cutting blades. This allows an alternative for adjusting the cutting plates. In detail the means comprises flexible elements 25 preferably made from spring steel and having bottom tongues 26 adapted to engage within dove-tailed grooves 27 formed in the bases of the arms of the jaws 11 directly above the pivot 10. Each of the grooves 27 have enlarged lower ends 28 so that the tongues 26 may be slipped easily into place. Elements 25 when in place are located at the base of the jaws 11 and so hold the B. X. wires 16 at different distances relative to the blades 14 for the purpose previously described. In other respects this form of the device is similar to the preferred form and corresponding parts may be recognized by similar reference numbers.

The electrician's tool according to this invention may be used for stripping insulation and the metallic casing of B. X. wire and for other purposes readily understood by a mechanic. When the handles 12 are close together the jaws 11 will correspondingly close and the blades 14 cut the top of B. X. wire placed immediately below the blades and upon the bases of the jaws. The jaws should next be opened and the B. X. wires turned for cutting another portion thereof and in this manner until it is sufficiently cut so that it may be removed by gripping it between the jaws and pulling it from its place.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An electrician's tool, comprising a pair of crossed members pivotally connected at the crossing point and one of the ends forming handles and the other ends contacting gripping jaws, adjacent faces of said jaws being laterally recessed and opposed faces being formed with opposed recesses, and shearing blades adjustably mounted within said lateral recesses and spaced longitudinally from the pivot of said jaws and intersecting said opposed recesses providing a space in which B. X. wire may be placed so that the top portion of the B. X. wire is cut when the jaws are closed.

2. An electrician's tool, comprising a pair of crossed members pivotally connected at the crossing point and one of the ends forming handles and the other ends contacting gripping jaws, adjacent faces of said jaws being laterally recessed and opposed faces being formed with opposed recesses, and shearing blades mounted within said lateral recesses and spaced longitudinally from the pivot of said jaws and intersecting said opposed recesses providing a space in which B. X. wire may be placed so that the top portion of the B. X. wire is cut when the jaws are closed, means for relatively changing the distance from the bases of the jaws and said shearing blades, comprising changing the location of the bases of the jaws without changing the location of the blades.

3. An electrician's tool, comprising a pair of crossed members pivotally connected at the crossing point and one of the ends forming handles and the other ends contacting gripping jaws, adjacent faces of said jaws being laterally recessed, and opposed faces being formed with opposed recesses, shearing blades adjustably mounted within said lateral recesses and spaced longitudinally from the pivot of said jaws and intersecting said opposed recesses providing a space in which B. X. wire may be placed so that the top portion of the B. X. wire is cut when the jaws are closed, and means for padding the bases of said jaws for holding the B. X. wire at a different distance to said cutting blades.

4. An electrician's tool, comprising a pair of crossed members pivotally connected at the crossing point and one of the ends forming handles and the other ends contacting gripping jaws, adjacent faces of said jaws being laterally recessed and opposed faces being formed with opposed recesses, shearing blades adjustably mounted within said lateral recesses and spaced longitudinally from the pivot of said jaws and intersecting said opposed recesses providing a space in which B. X. wire may be placed so that the top portion of the B. X. wire is cut when the jaws are closed, and means for padding the bases of said jaws for holding the B. X. wire at a different distance to said cutting blades, comprising resilient elements, and means for holding said resilient elements upon the base portions of said jaws.

5. An electrician's tool, comprising a pair of crossed members pivotally connected at the crossing point and one of the ends forming handles and the other ends contacting gripping jaws, adjacent faces of said jaws being laterally recessed, and opposed faces being formed with opposed recesses, and shearing blades mounted within said lateral recesses and spaced longitudinally from the pivot of said jaws and intersecting said opposed recesses providing a space in which B. X. wire may be placed so that the top portion of the B. X. wire is cut when the jaws are closed, and means for relatively changing the distance between the bases of the jaws to said shearing blades.

WILLIAM CRAUSE.